(12) United States Patent
Nixon et al.

(10) Patent No.: US 7,668,608 B2
(45) Date of Patent: Feb. 23, 2010

(54) GRAPHICAL PROGRAMMING LANGUAGE OBJECT EDITING AND REPORTING TOOL

(75) Inventors: Mark J. Nixon, Round Rock, TX (US); Ling Zhou, Cedar Park, TX (US); Brian Crandall, Austin, TX (US); Larry O. Jundt, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 303 days.

(21) Appl. No.: 11/469,827

(22) Filed: Sep. 1, 2006

(65) Prior Publication Data

US 2008/0058969 A1    Mar. 6, 2008

(51) Int. Cl.
G05B 19/042 (2006.01)
G06F 9/44 (2006.01)

(52) U.S. Cl. .......................... 700/87; 715/763; 715/967; 717/105

(58) Field of Classification Search .................... 700/86, 700/87; 715/763, 967; 717/105, 109
See application file for complete search history.

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,610,828 A | 3/1997 | Kodosky et al. |
| 5,652,909 A | 7/1997 | Kodosky |

(Continued)

FOREIGN PATENT DOCUMENTS

GB         2 395 801         6/2004

(Continued)

OTHER PUBLICATIONS

Great Britain Search Report for Application No. GB0717004.6, dated Dec. 21, 2007.

*Primary Examiner*—Albert DeCady
*Assistant Examiner*—Steven R Garland
(74) *Attorney, Agent, or Firm*—Marshall, Gerstein & Borun LLP

(57) ABSTRACT

A method and system of editing a graphical programming language object for designing a process control entity within an off-line database. The method and system enables a user to select one or more programming language object fragments from a library of programming language object fragments, and displays the selected programming language object fragments within a graphical programming language object interface display. The programming language object fragments are programming logic routines for a process control entity, such as steps, transitions and actions. Using the selected programming language object fragments, the user is enabled to configure a graphical programming language object for a process control entity within a graphical programming language object interface display. The graphical programming language object is stored as a configuration file in a format used by the off-line database, and is mapped to a format different from that used by the off-line database for generating reporting documentation and sharing the configuration file with a configuration database.

51 Claims, 6 Drawing Sheets

U.S. PATENT DOCUMENTS

| | | |
|---|---|---|
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,732,277 A | 3/1998 | Kodosky et al. |
| 5,734,863 A | 3/1998 | Kodosky et al. |
| 5,737,622 A | 4/1998 | Rogers et al. |
| 5,760,788 A * | 6/1998 | Chainini et al. ............. 345/474 |
| 5,821,934 A | 10/1998 | Kodosky et al. |
| 5,987,246 A | 11/1999 | Thomsen et al. |
| 5,990,906 A | 11/1999 | Hudson et al. |
| 6,064,409 A | 5/2000 | Thomsen et al. |
| 6,154,875 A * | 11/2000 | Tanaka et al. ............... 717/107 |
| 6,173,438 B1 | 1/2001 | Kodosky et al. |
| 6,219,628 B1 | 4/2001 | Kodosky et al. |
| 6,584,601 B1 | 6/2003 | Kodosky et al. |
| 6,608,638 B1 | 8/2003 | Kodosky et al. |
| 6,684,385 B1 * | 1/2004 | Bailey et al. ................ 717/109 |
| 6,715,139 B1 | 3/2004 | Kodosky et al. |
| 6,763,515 B1 | 7/2004 | Vazquez et al. |
| 6,784,903 B2 | 8/2004 | Kodosky et al. |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,010,470 B2 | 3/2006 | Kodosky et al. |
| 7,062,718 B2 | 6/2006 | Kodosky et al. |
| 7,134,086 B2 | 11/2006 | Kodosky |
| 7,134,090 B2 | 11/2006 | Kodosky et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,216,334 B2 | 5/2007 | Kodosky et al. |
| 7,219,306 B2 | 5/2007 | Kodosky et al. |
| 7,302,675 B2 | 11/2007 | Rogers et al. |
| 2001/0020291 A1 | 9/2001 | Kudukoli et al. |
| 2001/0024211 A1 | 9/2001 | Kudukoli et al. |
| 2001/0025231 A1 | 9/2001 | Kodosky et al. |
| 2002/0004712 A1 | 1/2002 | Kodosky et al. |
| 2002/0055947 A1 | 5/2002 | Schultz et al. |
| 2002/0080174 A1 | 6/2002 | Kodosky et al. |
| 2002/0083413 A1 | 6/2002 | Kodosky et al. |
| 2002/0111783 A1 | 8/2002 | Kodosky et al. |
| 2002/0145629 A1 * | 10/2002 | Gabbert et al. ............... 345/763 |
| 2003/0034998 A1 | 2/2003 | Kodosky et al. |
| 2003/0035005 A1 | 2/2003 | Kodosky et al. |
| 2003/0035006 A1 | 2/2003 | Kodosky et al. |
| 2003/0035009 A1 | 2/2003 | Kodosky et al. |
| 2003/0035010 A1 | 2/2003 | Kodosky et al. |
| 2003/0037316 A1 | 2/2003 | Kodosky et al. |
| 2003/0037322 A1 | 2/2003 | Kodosky et al. |
| 2003/0046663 A1 | 3/2003 | Rogers et al. |
| 2003/0076355 A1 | 4/2003 | Kodosky |
| 2003/0172369 A1 | 9/2003 | Kodosky et al. |
| 2003/0184580 A1 | 10/2003 | Kodosky et al. |
| 2003/0184595 A1 | 10/2003 | Kodosky et al. |
| 2003/0184596 A1 | 10/2003 | Kodosky et al. |
| 2003/0195729 A1 | 10/2003 | Kodosky et al. |
| 2003/0195730 A1 | 10/2003 | Kodosky et al. |
| 2003/0195731 A1 | 10/2003 | Kodosky et al. |
| 2003/0195732 A1 | 10/2003 | Kodosky et al. |
| 2003/0196187 A1 | 10/2003 | Kodosky et al. |
| 2003/0200076 A1 | 10/2003 | Kodosky et al. |
| 2004/0004637 A1 | 1/2004 | Ghercioiu et al. |
| 2004/0005859 A1 | 1/2004 | Ghercioiu et al. |
| 2004/0010734 A1 | 1/2004 | Ghercioiu et al. |
| 2004/0150667 A1 * | 8/2004 | Dove et al. .................... 345/763 |
| 2004/0235384 A1 * | 11/2004 | Reich et al. .................... 445/24 |
| 2004/0243654 A1 * | 12/2004 | Burr et al. ..................... 708/164 |
| 2005/0032433 A1 | 2/2005 | Lee et al. |
| 2005/0050515 A1 | 3/2005 | Shah et al. |
| 2005/0055666 A1 | 3/2005 | Kornerup et al. |
| 2005/0257194 A1 | 11/2005 | Morrow et al. |
| 2005/0257195 A1 | 11/2005 | Morrow et al. |
| 2006/0004553 A1 | 1/2006 | Kodosky et al. |
| 2006/0005160 A1 | 1/2006 | Schultz et al. |
| 2006/0036799 A1 | 2/2006 | Shah et al. |
| 2006/0053407 A1 | 3/2006 | Kodosky et al. |
| 2007/0093994 A1 | 4/2007 | Kodosky et al. |
| 2007/0150859 A1 | 6/2007 | Kodosky et al. |
| 2007/0169053 A1 | 7/2007 | Kodosky et al. |
| 2007/0198236 A1 | 8/2007 | Kodosky et al. |
| 2007/0198923 A1 | 8/2007 | Kodosky et al. |
| 2007/0203683 A1 | 8/2007 | Kornerup et al. |
| 2007/0204234 A1 | 8/2007 | Kodosky et al. |
| 2007/0225954 A1 | 9/2007 | Kodosky et al. |
| 2007/0261024 A1 | 11/2007 | Kodosky et al. |

FOREIGN PATENT DOCUMENTS

| | | |
|---|---|---|
| GB | 2 417 574 | 3/2006 |
| GB | 2 417 575 | 3/2006 |
| GB | 2 418 030 | 3/2006 |
| GB | 2 418 031 | 3/2006 |

* cited by examiner

| Table Name | Field Name | Field Type | Description |
|---|---|---|---|
| CompositeLibrary | ParentPath | String | The Path of the parent |
| | Path | string | The UID of this item in the SQL database. Path = ParentPath/Name |
| | Description | String | The description of this composite. |
| | Name | String | The name of this composite. For example, C1. |
| StepLibrary | ParentPath | string | The UID of this item in the SQL database. Example: "" or C1. C1 indicates this step belongs to composite C1. |
| | Path | string | The UID of this item in the SQL database. Path = ParentPath/Name |
| | Description | String | The description of this step. |
| | Name | String | The name of this step. For example, S1. |

| Table Name | Field Name | Field Type | Description |
|---|---|---|---|
| ActionLibrary | ParentPath | String | The Path of the parent, for example, S1 or C1/S1 |
| | Path | string | The UID of this item in the SQL database. Path = ParentPath/Name |
| | Description | String | The description of this Action. |
| | Name | String | The name of this action. For example, A1. |
| TransitionLibrary | ParentPath | string | The UID of this item in the SQL database. Example: "" or C1. C1 indicates this transition belongs to composite C1. |
| | Path | string | The UID of this item in the SQL database. Path = ParentPath/Name |
| | Description | String | The description of this transition. |
| | Name | String | The name of this transition. For example, T1. |

*FIG. 5*

GRAPHICAL PROGRAMMING LANGUAGE OBJECT EDITING AND REPORTING TOOL

FIELD OF THE TECHNOLOGY

The present disclosure relates generally to process control systems within process plants and, more particularly, to an editing and reporting tool for designing a process control entity associated with the process plant.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

Engineering a project for a process plant or a process control system is a complex process which starts at a conceptual phase and progresses through to the startup and operations of a process plant or process control system. During the engineering and design of a project, engineering details are pulled together covering the process and plant design, selection of instrumentation and control devices, selection of a control system, engineering of the control system, installation, commissioning and startup. These engineering details are captured in a variety of databases, and are pulled together into a common configuration system. The configuration system is used to generate reports for communication with end users, such as customers, generating project and process control strategy configuration. The reporting documents are often generated using standardized documentation tools, such as hypertext markup language (HTML), portable document format (PDF), Microsoft Word, Microsoft Visio, etc.

There are many aspects to configuring a distributed process control system, including, but not limited to, I/O, control strategy, batch, object linking and embedding (OLE) for process control (OPC) integration, history, displays, etc. The configuration system, and underlying database, provides tools and infrastructure for configuring a integrated solution to a process control system project. Configuration systems, such as DeltaV™ sold by Fisher-Rosemount Systems, Inc. of Austin, Tex., and configuration system applications, such as Explorer, Control Studio, Recipe Studio, Graphics Studio and User Manager each sold by Fisher-Rosemount Systems, Inc. of Austin, Tex., are used to configure the entire process control strategy, displays, I/O, alarm strategies, history and events, users and their roles, and every other part of the process control system. Such an arrangement works well, if the configuration system is in the central database, but this is not always the case.

The overall configuration process often extends beyond what the configuration system is designed to support. For example, I/O definitions, device specifications, unit requirements, and other information may be specified and configured using tools and databases that are separate from the configuration system. While using this information to configure the configuration system is very straightforward, it is often the case that the configuration databases use formats that are not understood by other design tools. These databases are also not understood by applications that project teams often work with as tools of choice across the entire project lifecycle, such as Microsoft Excel, Microsoft Word, SQL, Microsoft Visio, etc. Furthermore, not all members of a project team have the configuration system software installed, and often a project team wants to perform their work off-line using commonly available tools. Using such tools makes it much easier to exchange data with other contributors to the project, and to exchange data with the end-user. Once the off-line data is ready, the data needs to be imported to the configuration system. If the data is modified within the configuration system, or by another off-line database, then the modified data needs to be updated with the off-line database.

Further, project personnel add considerable value in consulting and writing specifications to make sure that the hardware and software design will meet the needs of the end user. Implementation, testing and documenting are done once the design has been approved. However, techniques to transfer such configuration details should be transferred into the configuration system, which may require interfaces and tools to translate the configuration details from one form to another and to transfer configuration details between off-line databases. Standardized objects simplify the development of project tools because they provide known data models to communicate with other teams on the project so that there is a clear definition of what data is required and when. They also help the project team quickly rejected bad or incomplete data. The standardized objects have been provided for the continuous control layer (e.g., loops, motors, valves, equipment modules, etc.), but the batch layer (e.g., phases, operations, procedures) has been standardized too a much lesser degree.

SUMMARY

An editing and reporting tool is provided to edit graphical programming language objects for designing a process control entity within an off-line database. A user is enabled to select data relating to programming language object fragments from a library of programming language object fragments. The programming language object fragments are provided as templates of programming logic routines for the process control entity, such as steps, transitions, actions or other portions of programming code. Using the programming language object fragments, a user may configure a graphical programming language object, such as a sequential function chart (SFC) object, from the programming language object fragments. The editing and reporting tool may be provided as a graphical user interface (GUI) which enables a user to select representations of the programming language object fragments and present the selected programming language object fragments within a graphical programming language object interface display. Parameters of the programming language object fragments may be modified and interconnections between programming language object fragments may be established in configuring the graphical programming language object. The configured graphical programming language object may be stored as a configuration file in a format used by the off-line database. A reporting tool maps the format used by the off-line database to a format used by the configuration database, and populates a reporting document with the data of the configuration file, where the reporting document is in a format different from that used by the off-line database. The editing and reporting tool further enables a user to concurrently edit multiple programming language object fragments.

The editing and reporting tool provides an engineering and design productivity tool which works with a variety of formats, and provides a user interface and shared library of programming language object fragments that allows a user to create standardized programming language object fragments which may be reused, and further allows the user to create composite programming language object fragments from other programming language object fragments. The user is further allowed to store programming language object fragments, such as actions, steps and transitions, as a local library of programming language object fragments to be reused during the editing of a phase class, SFC composite or other graphical programming language object. The library of programming language object fragments may be stored in a code library master which distributes copies of the library to other off-line databases having the editing and reporting tool. The user may use the local off-line database, such as an SQL database for storage and use XML as a transportation mechanism when communicating project data with the configuration system.

The editing and reporting tool further enables different project groups to share the same SQL databases, and allows a user to construct free-formatted documents and storage templates. The documents and templates may be automatically populated with the editing and reporting tool to generate reporting documentation from the off-line database as a representation of the algorithm for the graphical programming language object. Conversion between the off-line database format and the configuration database format allows a user to work on any configuration system object type using one object type within the off-line database.

As such, engineering productivity is improved by use of configuration tools throughout the project lifecycle. For example, the editing and reporting tool may assist the user to edit a phase class or SFC composite without connecting to a node having the configuration system software and the edited data is stored in the local off-line database. Upon completion of an SFC composite, phase class or other graphical programming language objects, a user can choose to use the editing and reporting tool to synchronize local graphical programming language data with the configuration database by exporting the data from the local off-line database into a file format understood by the configuration database, such as FHX, and importing the data to the configuration database.

BRIEF DESCRIPTION OF THE DRAWINGS

FIG. 5 is an example of a format for storing programming language object fragments within an off-line database.

DETAILED DESCRIPTION

Figure 1:
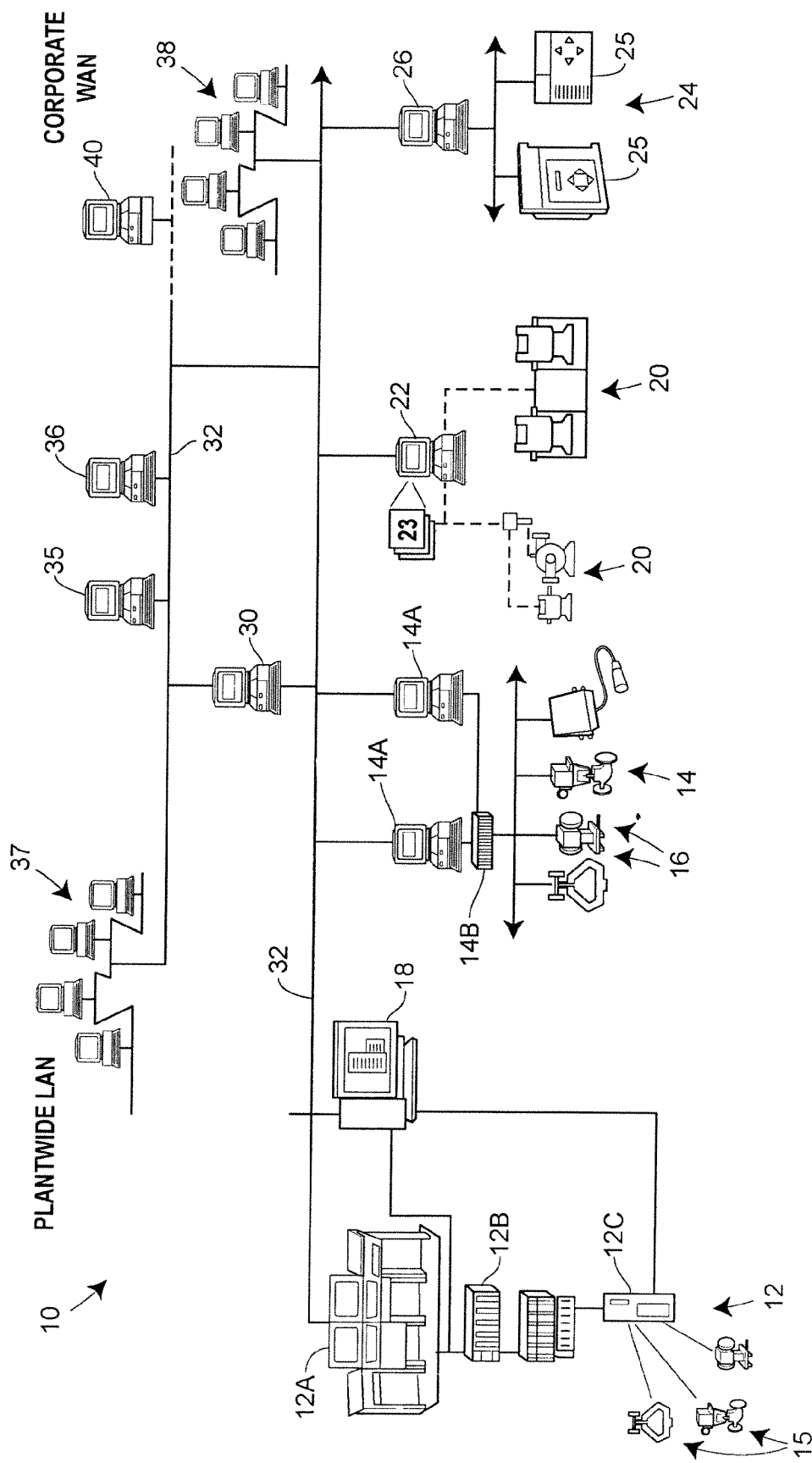
FIG. 1 is a schematic diagram of a process plant displaying an example of a hierarchical structure of equipment and instructions implemented in a process plant.

Referring now to FIG. 1, a process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application, such as AMS Device Manager sold by Fisher-Rosemount Systems, Inc., or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are connected to a maintenance computer 22 via some permanent or temporary communication link (such as a bus, a wireless communication system or hand held devices which are connected to the equipment 20 to take readings and are then removed). The maintenance computer 22 may store and execute known monitoring and diagnostic applications 23, for example RBMware™ sold by CSi Systems of Knoxville, Tenn., AMS Machinery Manager sold by Fisher-Rosemount Systems, Inc. or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other companies to control and maintain the power generation and distribution equipment 25.

A computer system 30 is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a bus 32. The bus 32 may use any desired or appropriate local area network (LAN) or wide area network (WAN) protocol to provide communications. As illustrated in FIG. 1, the computer 30 is also connected via the same or a different network bus 32 to business system computers and maintenance planning computers 35 and 36. The computer 30 may also be connected via, for example, the bus 32, to a plantwide LAN 37, a corporate WAN 38 as well as to a computer system 40 that enables remote monitoring of or communication with the plant 10 from remote locations. Alternatively, or in addition, the computer system 30 process control system 12, distributed process control system 14, maintenance interface 18, process control and/or maintenance interfaces 14A, rotating equipment maintenance computer 22, and/or the power generation and distribution computer 26 may be interconnected via an internet and communicate via an internet-compatible protocol. Accordingly, the plant 10 may be provided with viewing and control functions via one or more remote facilities which to view and control the various systems, computers and routines within the plant 10.

In addition, remote monitoring facilities may be communicatively coupled to the plant 10 via the internet to provide access to additional analysis and diagnostics resources. In one example, the plant 10 may be coupled to a failure defense planning system, which includes an analysis of the various plant assets and prioritizes the assets according to their importance to the plant or to systems within the plant to provide criticality data.

Figure 2:
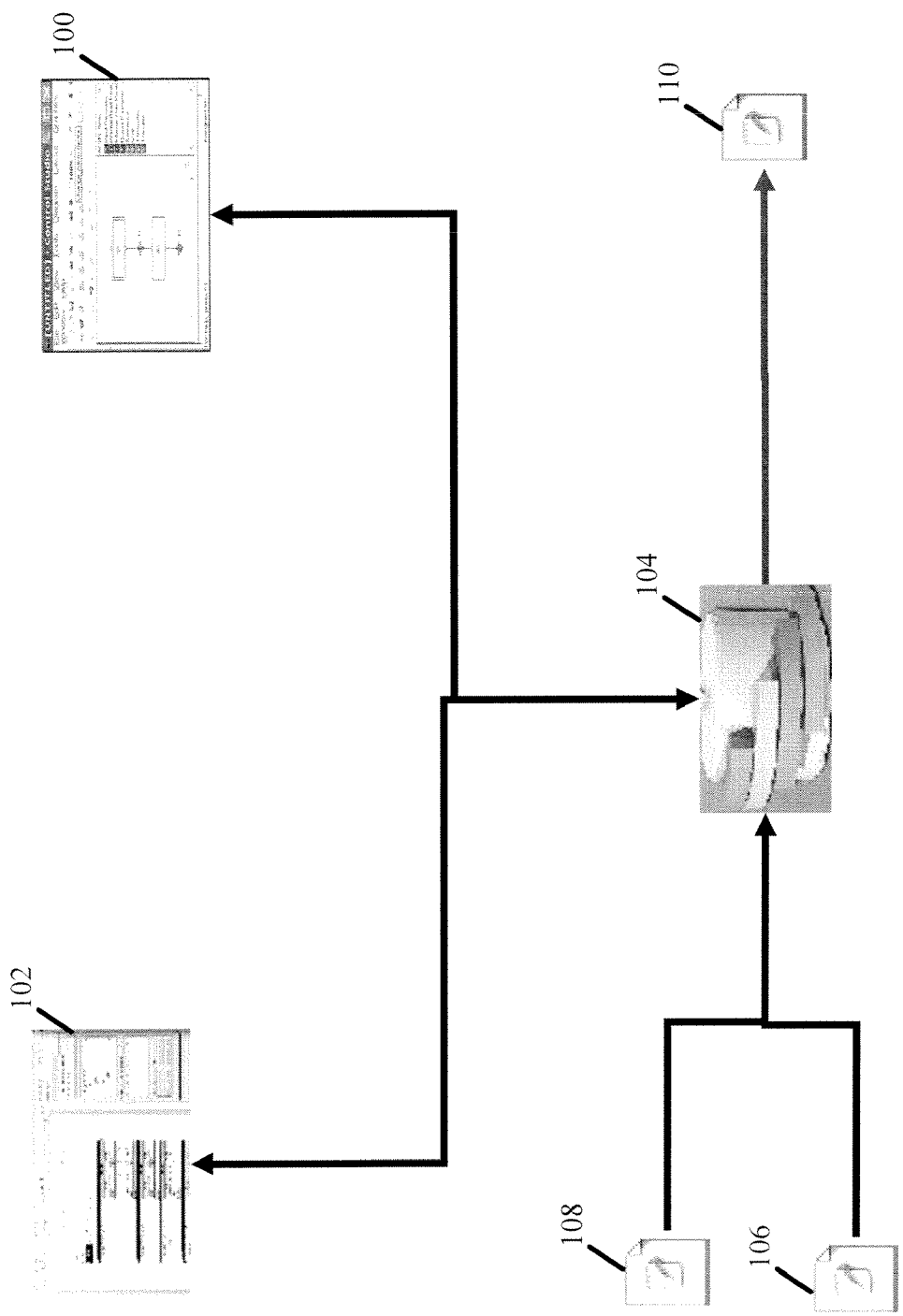
FIG. 2 is a block diagram of an example of an architecture for an editing and reporting tool for designing a process control entity within a process plant.

Referring to FIG. 2, an example of the architecture for an editing and reporting tool for designing a process control entity within a process plant is shown. In particular, the editing and reporting tool may be used to create process control and plant designs, select instrumentation and control devices, select a process control system, engineer the process control entity, establish installation of the process control entity, commission the process control entity and start up the process control entity, for example. As mentioned above, process control entity may relate to any entity within a process control system or process control plant, including, but not limited to, devices, loops, sub-units, units, areas or the process plant itself. As will be understood, the editing and reporting tool may be used for engineering virtually any project relating to a process control system. Further, the editing and reporting tool may be used to generate reports for communication with customers or other end users, documentation according to standard tools utilized by end users, control strategy configuration, and virtually any other aspect associated with designing and engineering a process control system, including, but not limited to, I/O, control strategy, batch, OPC integration, history, displays, etc.

In particular, the results from the editing and reporting tool may be provided to a configuration system, such as DeltaV™ sold by Fisher-Rosemount Systems, Inc. of Austin, Tex., or any other configuration system and underlying database that provides tools and infrastructure for configuring integrated solutions for process control system design and engineering. For example, various tools and applications of the configuration system, such as Explorer, Control Studio, Recipe Studio, Graphics Studio and User Manager associated with DeltaV™ and sold by Fisher-Rosemount systems Inc. of Austin, Tex., may be used to configure the entire control strategy, displays, I/O, alarms strategies, history, events, users, user roles and every other part of the system. Many of the tools and applications of the configuration system may be distributed among databases that are separate and off-line from the configuration system itself. Further, many engineering and design groups involved in the process control project may use tools and applications that are not readily understood by each other or the configuration system, and are also distributed among databases separate and off-line from the configuration system, which may not even include the software of the configuration system. The editing and reporting tool allows such users to work in databases off-line from the configuration system to engineer design process control entities using a graphical programming language, such as sequential chart function (SFC) which is used for programmable logic controllers (PLC). As is known, SFC may be a language defined by the IEC 61131-3 standard, and specifically defined in IEC 848. Generally, SFC utilizes program processes defined according to steps with associated actions and transitions with associated conditions, where various blocks represent steps and actions, and lines interconnecting the blocks represent transitions and conditions. However, it should be understood that other graphical programming languages may be used.

Referring to FIG. 2, the editing and reporting tool includes an editing tool 100 and a reporting tool 102, each of which may provided as an application which may be stored on a computer readable medium and executed on a processor to perform the various functions associated therewith. The editing tool 100 and the reporting tool 102 are each operatively coupled to an off-line database 104 utilized by engineers, designers and other users of the editing and reporting tool. In one example, the editing tool 100 and the reporting tool 102 may be provided within and executed from the off-line database 104. The off-line database 104 may be, for example, a relational database, such as structured query language (SQL) database, which maintains data within database tables. The use of an SQL database provides the ability to search and replace information across multiple off-line databases 104, which may be particularly useful during early stages of the project. During later stages, particularly during acceptance, commissioning and startup, changes may be made directly to the control system configuration.

The off-line database 104 includes a plurality of programming language object fragments 106, each of which may be a programming logic routine for a process control entity. The programming language object fragments 106 are provided as templates of the programming logic routines without any parameter values or with default parameter values. In other words, the programming language object fragments provide the basic structure of the programming logic routine. In particular, each of the programming language object fragments 106 may be snippets of programming code that represent chunks or snippets of a configuration for a process control entity, such as individual steps, transitions and actions associated with process control. Further, the programming language object fragments 106 may include, or relate to, parameters, function blocks, phases, operations, procedures or other process control objects. In an example described further below, a programming language object fragment 106 may be a composite of other programming language object fragments. As will be discussed further, the programming language object fragments 106 may be provided within a code library file maintained by a master code library database and imported to the off-line database 104.

Still further, the off-line database 104 may include graphical programming language objects 108, which may be configured by a user from the programming language object fragments 106. As will be discussed further below, graphical programming language objects 108, such as SFC objects, may be imported to the off-line database 104, from other data sources such as other off-line databases utilizing the editing and reporting tool or from the configuration system. Graphical programming language objects may include, but are not limited to, composite function blocks, such as an SFC composite, and phase classes. Once a graphical programming language object has been configured using the editing tool 100, the reporting tool 102 converts the format of the graphical programming language object to a format understood by the configuration system and generate reporting documentation for the graphical programming language object in a standardized format understood by the configuration system and by end users. The configured graphical programming language object 110 is provided from the off-line database 104 to the configuration system.

Figure 3:
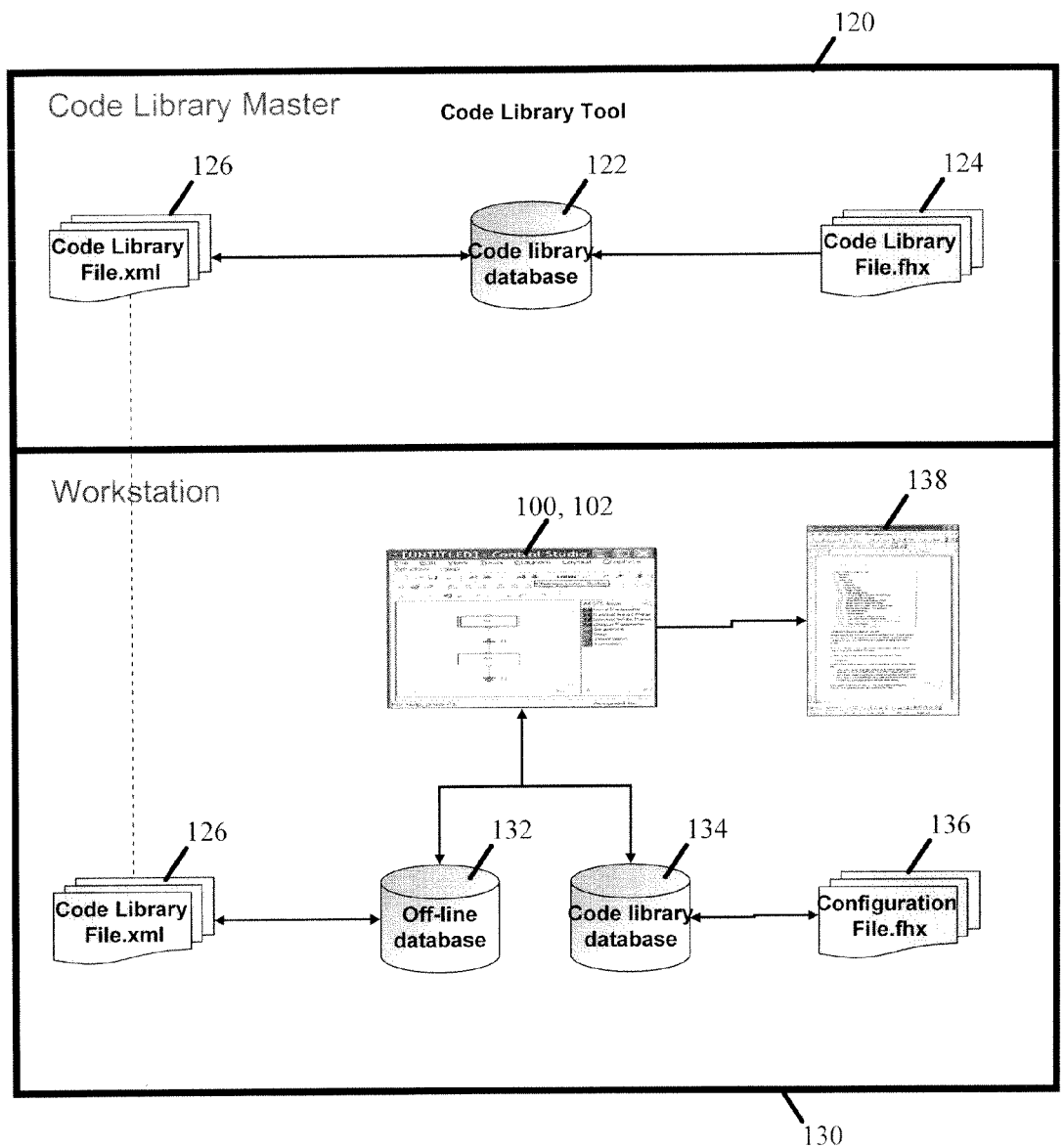
FIG. 3 is a block diagram of an example of an editing and reporting system for configuring a graphical programming language object.

Referring to FIG. 3, an example of an editing and reporting system is shown. In particular, the system includes a code library master 120 which maintains a master library copy of the programming language object fragments and a workstation 130 which implements the editing and reporting tool. In one example, the code library master 120 is maintained within the configuration system to provide a central repository and distribution center for the code library files. Although only one workstation 130 is shown, it should be understood that multiple workstations 130, each operatively coupled with an off-line database 104, may be provided in the system.

The code library master 120 includes a code library database 122 which maintains, or operates with, a code library tool and a code library file of the programming language object fragments. The code library file contains a list of actions, steps and transitions, or other programming language object fragments, to be used by the editing tool 100 to configure the graphical programming language object 110. The code library file may be provided as the result of an import from a node of the configuration system. In one instance, the code library file 124 is imported to the code library database 122 in a format associated with the configuration system. For example, DeltaV™ uses an FHX file format and maintains files using an FHX extension. The FHX code library file may be created from a configuration system process control strategy application, such as DeltaV™ Control Studio. In particular, a user creates a template of a programming language object fragment, which is the basis for the code library file. The templates are modified by the editing tool 100 by providing or modifying parameters of the programming language object fragment. As a result, the programming language object fragments may be reused and configured by each user at different workstations 130 when configuring a graphical programming language object using the editing tool 100.

A user may create a new composite block in the configuration system process control strategy software, and create multiple actions for a process control strategy. For example, a step for a process control valve may include actions such as open valve, close valve, start motor, stop motor, disable interlocks, or any other action that may be taken by a process control valve. Once the actions have been created, the block may be saved. The resulting code library file contains programming language object fragments that provide templates for steps, actions, transitions, or other graphical programming language object items for a process control entity. The code library file is provided in the configuration system format (e.g., FHX). Using a configuration system navigation application, such as DeltaV™ Explorer, the user may export the block under a composite template node in the configuration system library, and the configuration system saves the code library file configuration system format, for example as an FHX file.

The code library master 120 stores the code library file 124 in the code library database 122, and exports the code library file 126 to the off-line database 104 in a format understood by the off-line database 104. For example, the code library file 126 may be provided in an extensible markup language schema, such as XML. In particular, the code library master 120 may convert the code library file 124 from the configuration database format to the off-line database format by mapping the programming language object fragment data between the two format schemas. For example, the formats of the FHX file may be read, and the formatting parameters may be mapped to formatting parameters of the XML format, and the XML data file may be generated by populating data fields of the XML file with the programming language object fragment data according to the map.

Figure 4:
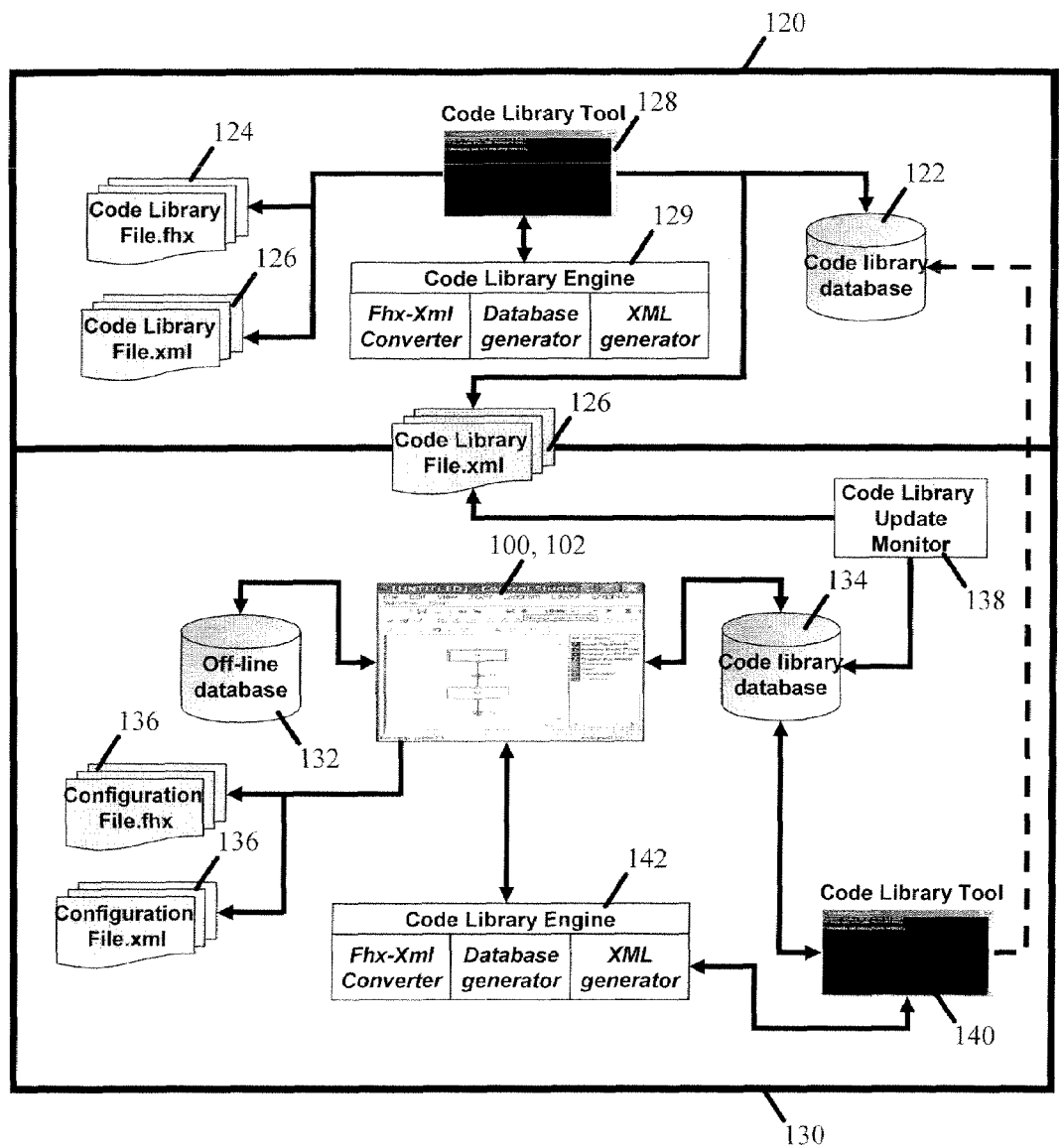
FIG. 4 is a more detailed block diagram of the editing and reporting system of FIG. 3.

In particular, a format converter, an example of which is shown in FIG. 4, enables a user to map an off-line database format schema to a configuration database format schema, and vice versa. In mapping the off-line database format schema to the configuration database format schema, one or more of the data elements or attributes of the off-line database format schema may be mapped to one or more data elements or attributes of the configuration database format schema. Because there may not be a one-to-one correspondence between the data elements of format schemas, the data mapping may involve intermediate data manipulations. These intermediate data manipulations enable one or more off-line database formats schema data elements to be processed or combined using data manipulation functions such as, for example, string concatenations, mathematical operations, number generations, etc.

When mapping between formats schemas, each required data element of a configuration database format schema is mapped to at least one corresponding data element of the off-line database format schema. Of course, some or all of the data elements of the particular off-line database format schema may not be used during the mapping and not all of the data elements of the configuration database format schema (i.e., those data elements that may not be required) may be mapped to data elements of the off-line database format schema. Furthermore, multiple data elements of the off-line database format schema may be combined or otherwise manipulated and mapped to a single data element of the configuration database format schema using the data manipulation functions as noted above.

The workstation 130 receives the code library file 126 from the code library master 120 and stores the code library file 126 in the off-line database 132 that corresponds with the workstation 130, and which may be referred to as a local or off-line configuration database 132. The workstation 130 maintains a local version of the code library file 126 in a code library database 134. When a user executes the editing tool 100, the workstation 130 creates an instance of the editing tool 100 and establishes communication with the code library master 120. More particularly, the workstation 130 establishes communication with the code library database 122, and synchronizes the local code library database 134 with the master code library database 122. The programming language object fragments are received from the code library master 120 and provided within the GUI of the editing tool 100 as graphical representations of the programming language object fragments. An example of the GUI is discussed further below. While the editing tool 100 is being executed, the workstation 130 may periodically communicate with the code library master 124 to provide changes or updates to the code library file 126.

In addition to loading the code library file 126 into the editing tool 100, a user may load a composite block configuration file into the editing tool 100. The composite block configuration file may relate to a composite block for a graphical programming language object that was created or modified at the configuration system, or at another workstation. The composite block configuration file may also relate to a composite block of a group of programming language object fragments stored as a composite programming language object fragment. In other words, the composite block is a composite of previously defined steps, actions, transitions, etc. for a process control entity, such as an SFC composite, which may be subsequently modified by the editing tool 100. To load the composite block file into the editing tool 100, the editing tool 100 may prompt the user for the appropriate graphical programming language configuration file 110. The configuration file 110 may be provided in the configuration system format and exported from the configuration database. The editing tool 100 reads the configuration file and converts the format of the configuration file from the configuration system format to the format used by the off-line database 104, such as XML or an SQL database format. If the off-line database 104 is an SQL database, the editing tool creates appropriate tables for the following types: composite, parameter, step, action, transition, connector, text graphic, rectangle graphic, line graphic. The editing tool 100 fills the table with data records coming from the configuration file 110 and displays the composite block within the GUI of the editing tool 100, including corresponding linked or embedded composites, a diagram of the composite block, parameters of the composite block and steps/transitions of the composite block.

Alternatively, a user may load a phase class configuration file in a manner similar to the composite block file above. As above, the configuration file 110 may be provided in the configuration system format and exported from the configuration database. The editing tool 100 reads the configuration file and converts the format of the configuration file from the configuration system format to the format used by the off-line database 104. If the off-line database 104 is an SQL database, the editing tool creates appropriate tables for the following types: phase, phase parameter, phase logic block, block parameter, step, action, transition, composite (linked or embedded), connector and text graphic. The editing tool 100 fills the table with data records coming from the configuration file 110 and displays the phase class within the GUI of the editing tool 100, including corresponding phase logic blocks and corresponding link or embedded blocks, the phase logic module (PLM) and parameters of the phase class.

The workstation 130 communicates with the configuration database by sending and receiving graphical programming language configuration files 136. The workstation 130 also includes local versions of the editing tool 100 and the reporting tool 102. The editing and reporting tools 100, 102 communicate with the off-line configuration database 132 and the local code library database 134 of the workstation 130 to configure a graphical programming language object using the programming language object fragments from the code library file 126. The configured graphical programming language object is stored within the configuration file 136, and exported to the configuration database. In addition, because other users may modify the graphical programming language object either at the configuration database or at other workstations 130, the workstation 130 may receive modified graphical programming language objects from the configuration database, which may be the composite blocks or phase classes disclosed above, which in turn may be configured using the editing tool 100. Still further, reporting documents 138 may be generated by the reporting tool 102 which corresponds with the configured graphical programming language object.

Examples of configuring a graphical programming language object include creating a new composite block and creating a new phase class. To create a new composite block using the editing tool 100, a user may create a new file for the new composite block, and the editing tool 100 creates an object of a new composite block within the workstation's memory from a default configuration for the composite block, which may be provided as a programming language object fragment, such as a composite programming language object fragment. The default configuration is presented within the GUI of the editing tool 100. For example, the GUI may display the new composite block, a step being configured for the composite block, and parameters of the composite block. To create a new phase class using the editing tool 100, a user may create a new file for the new phase class, and the editing tool 100 creates an object of a new phase class within the workstations memory from a known default configuration. The default configuration for the new phase class is presented within the GUI of the editing tool 100. For example, the GUI may display the new phase class along with default phase logic blocks, such as ABORT_LOGIC, FAIL_MONITOR, HOLD_LOGIC, RESTART_LOGIC, RUN_LOGIC, STOP_LOGIC. The GUI may further display the phase logic module (PLM) and parameters of the phase class.

The graphical programming language objects, such as composite blocks or phase classes either created by the editing tool 100 or modified as a result of an import from the configuration database, may be saved by the user, and the editing tool 100 updates the off-line database 104 of the recently created graphical programming language object or modifications thereto. For modified graphical programming language objects, the editing tool 100 copies the changes to the graphical programming language object from the off-line database 104 to the configuration file 110, converts the configuration file from the off-line database format (e.g., XML) to the configuration database format (e.g., FHX) and overrides the previously loaded configuration file in the configuration database format (e.g., the FHX configuration file). For newly created graphical programming language objects, the editing tool 100 updates the off-line database 100 of any recently performed changes, and copies the changes from the off-line database 104 to the configuration file 110, and creates a new configuration file in the configuration database format (e.g., FHX).

In addition to configuring a graphical programming language object, the editing tool 100 may create new programming language object fragments, either by modifying a programming language object fragment from the code library file 126 and or by creating a composite programming language object fragment from multiple programming language object fragments from the code library file 126. Such new programming language object fragments may be added to the code library file 126 and exported back to the code library master 120 which maintains the master copy of the code library file. In turn, the code library master 120 may distribute the updated code library file among other workstations 130, so that each workstation 130, and each corresponding engineering or design group has an updated copy of the code library file 126 that includes contributions from other engineering or design groups.

Referring to FIG. 4, a more detailed diagram of the system of FIG. 3 is shown. The code library master 120, which may be maintained within a separate workstation, is shown to include the code library database 122 for the programming language object fragments, which may be an SQL database. The code library master 120 further includes a code library tool 128 and a code library engine 129. As shown in FIG. 4, the code library engine 129 is used by the code library tool 128 to conduct the formatting mapping and conversion referenced above, for example converting between FHX and XML formats. The code library engine 129 further includes a database generator and XML generator for generating and maintaining the code library files for the code library database 122.

The code library tool 128 also facilitates distribution of the code library file 126 and updates thereof among the various workstations 130.

As described above, the workstation 130 receives updates of the code library file 126 and stores the code library file 126 in the local code library database 134. As also described above, the editing tool 100 may create new programming language object fragments which are stored within the local code library database 134 as an updated code library file. A code library update monitor 138 may monitor the local code library database 138 for such new programming language object fragments or other updates to the code library file 126, and provide the updated code library file 126 to the code library master 120.

The workstation 130 also includes a local copy of the code library tool 140 and of the code library engine 142. The code library tool 140 may communicate with the code library database 122 of the code library master 120, such as periodic communication for updates to the code library file 126. Like the code library tool 128 of the code library master 120, the local code library tool 140 uses the local code library engine 142 to conduct the formatting conversion, including converting the formats of the configuration file 136 between a format used by the workstation 130 and other formats, such as the format used by the configuration system. The local code library tool 140 also uses the local code library engine 142 to generate and maintain the code library file of the local code library database 134.

As referenced above, each programming language object fragment is stored within the local code library database 134, which may be an SQL database. As such, each programming language object fragment may be stored within an SQL table, examples of which are shown in FIG. 5. In particular, each table for a programming language object fragment includes a name, one or more field names, one or more field types associated with each field name and a description. The specifics of SQL databases and database tables are well known, and need not be discussed further herein.

Figure 6:
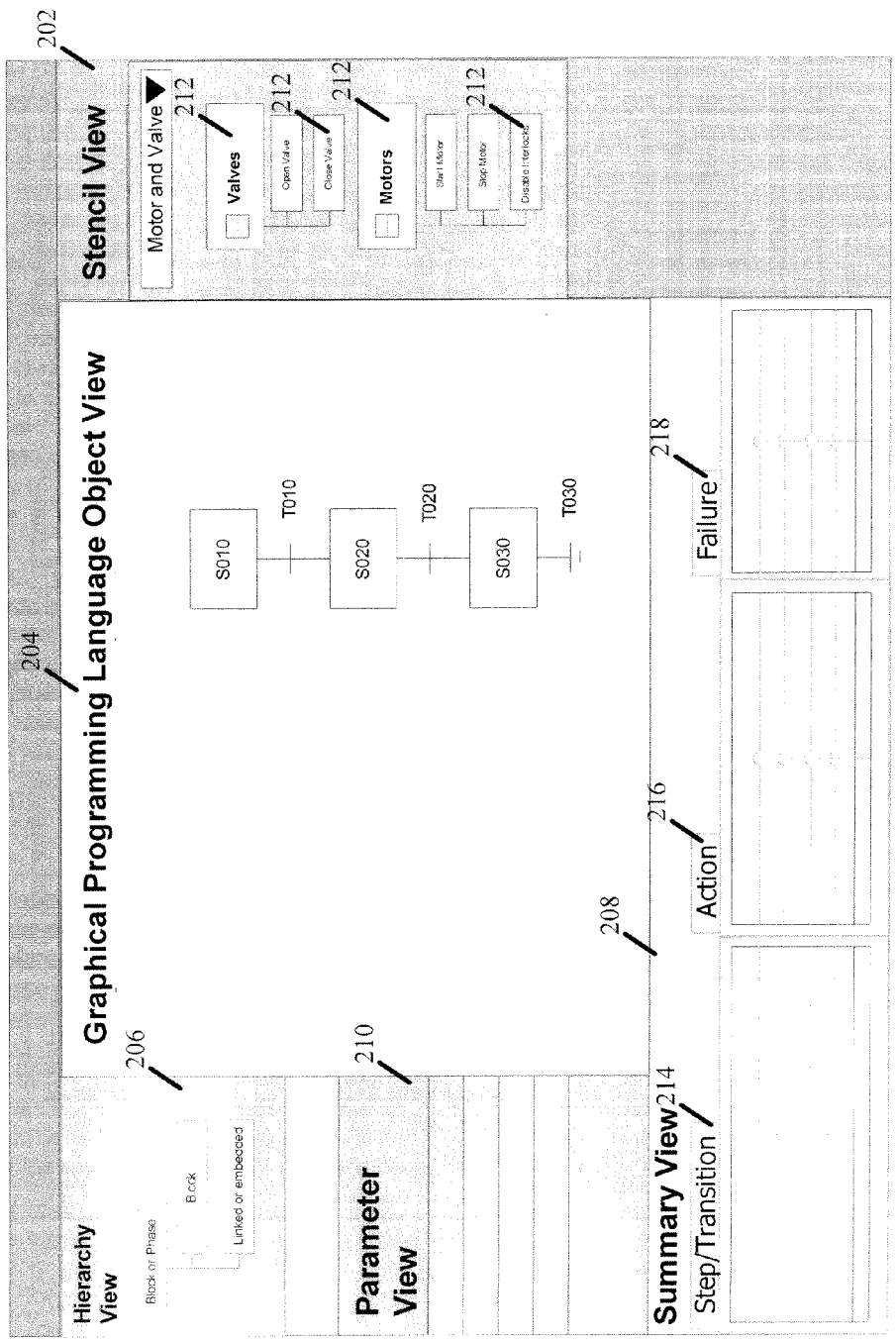
FIG. 6 is an example of a graphical user interface which may be used to configure a graphical programming language object.

FIG. 6 is an example of a user interface routine which provides graphical user interface (GUI) associated with the editing and reporting tool 100 and which may be used by a user to configure a graphical programming language object for a process control entity. However, before discussing the GUI in greater detail, it should be recognized that the GUI may include one or more software routines that are implemented using any suitable programming languages and techniques. Further, the software routines making up the GUI may be stored and processed within a single processing station or unit, such as, for example, the workstation 130, or alternatively, the software routines of the GUI may be stored and executed in a distributed manner using a plurality of processing units that are communicatively coupled to each other and with the offline database 104.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the editing and reporting tool described herein may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the editing and reporting tool.

Referring to FIG. 6, the GUI includes a display of various views used for configuring a graphical programming language object from one or more programming language object fragments. The GUI of the editing and reporting tool is provided as a stencil for creating and modifying a graphical programming language object for a process control entity. In particular, the GUI may enable a user to configure various data objects of the configuration system, including composite blocks, phase classes, equipment module classes and other objects. Generally, the editing and reporting tool, and the off-line database 104, utilize only one object type, such as a graphical programming language object, and more particularly an SFC object or SFC module which are used to control a process control entity. In one example, the only database object that the editing and reporting tool is aware of are the programming language object fragments, such as templates of programming logic routines associated with a phase class or composite, but it should be understood that is the functionality of the editing and reporting tool may be expanded to include other library objects. By utilizing one object type, the various versions of the editing and reporting tool distributed among the various off-line databases may provide a standardized format for the configuration system, and each editing and reporting tool may share at the code library files distributed by the code library master 120.

The various views within the GUI include, but are not limited to, a stencil view 202, a graphical programming language object view 204, a hierarchy view 206, a summary view 208 and a parameter view 210. The stencil view 202 provides a graphical interface of graphical programming language object items, and more particularly, representations 212 of the programming language object fragments which may be used to configure a graphical programming language object. As seen in FIG. 6, the programming language object fragments may be arranged according to various process control entities, such as valves, motors, loop control, etc., where each process control entity has associated programming language object fragments for steps, actions, transitions, or any other item for configuring the graphical programming language object for the process control entity. In one example, the stencil view is provided as a drop-down menu or set of menus, each of which may be expanded or retracted as indicated by the user. The stencil view 202 may enable the user to switch between one stencil to another, where each stencil may correspond to a different code library file or category of programming language object fragments. For example, a user may select the stencil drop-down, which contains all loaded or defined stencils, from the stencil view 202 and select "motor". The editing tool 100 displays the contents of the "motor" stencil in the stencil view 202 having a motor category with associated programming language object fragments, namely the actions of "start" and "stop" and "disable interlocks". To switch to another stencil, the user may select a different stencil from the drop-down menu, such as "valves", and the editing tool 100 displays the programming language object fragments associated with valves.

A user configures a graphical programming language object in the graphical programming language object view 204 from the programming language object fragments displayed within the stencil view 202. In particular, a user may select a programming language object fragment, such as a step, action or transition item, by clicking on the associated programming language object fragment representation and dragging the representation from the stencil view 202 into the graphical programming language object view 204. Alternatively, the user may drag the programming language object fragment representation from the stencil view 202 into the summary view 208, further disclosure of which is provided below. The editing tool 100 displays a properties dialog box (not shown) prompting the user for values for the available properties of the selected programming language object fragment. The user provides values for the available properties of the programming language object fragment, and the editing tool 100 displays the programming language object fragments in the graphical programming language object view 204. It is noted, however, that to configure a graphical programming language object using an action, the graphical programming language object already includes a step.

As disclosed above, a user may create new programming language object fragments using the editing tool 100 and which may be distributed to all workstations. The programming language object fragment may be stored as a stencil within the code library master 120. In particular, the stencil view 202 may include an "add" option, which the user selects. The editing tool 100 creates a blank stencil in the stencil view 202, and when the stencil drop-down is expanded, a new stencil item (e.g., a new programming language object fragment) is added having a default name. The user provides the new stencil with the name, specifies properties for the programming language object fragments(s) of the new stencil, and the editing tool 100 saves a new stencil to the code library master 120. Multiple programming language object fragments may be added as above and stored together as a composite programming language object fragment. Parameter values, either default or specific, may be added as above for each programming language object fragment within the composite programming language object fragment. Alternatively, multiple programming language object fragments may be concurrently selected, as disclosed further below, from the graphical programming language object view 204 and stored as a composite programming language object fragment, again with or without default or specific properties.

In one example, a user may create a new action within the stencil view 202 for a given stencil. For example, a new and empty stencil may exist named "motor and valve" having two stencil categories, namely "motor" and "valve", and a composite block configuration file in the configuration database format includes a composite block with the step and actions, such as "open valve", "close valve", "start motor", "stop motor", and "disable interlocks". The user may load the composite block configuration file in the configuration database format, as provided above, and drag the "open valve" and "close valve" action representations from the summary view 208 to the "valve" category in the stencil view 202. The editing tool 100 copies the actions and displays them underneath the "valve" category in the stencil view 202. Likewise, the user may drag the "start motor", "stop motor" and "disable interlocks" action representations from the summary view 208 to the "motor" category in the stencil view 202, and the editing tool 100 copies the actions and displays them underneath the "motor" category in the stencil view 202.

In addition to creating new programming language object fragments, a user may delete existing programming language object fragments. In particular, the stencil view 202 may include a "delete" option, and the user may select a representation of the desired programming language object fragment and select the delete option. The editing tool 100 removes the programming language object fragment from the local code library database 134, and may further remove the programming language object fragment from the code library master 120.

Additional user actions which may be enabled by the stencil view 202 include renaming programming language object fragments by providing a "rename" option, creating a new categories of programming language object fragments within a particular stencil by providing a "new category" option, and saving new or modified stencils by providing a "save" option which saves all stencil changes to the code library master 102. Certain actions may be limited to particular users having authority for deleting or modifying code library files from the code library master 120.

The graphical programming language object view 204 provides a graphical view of the graphical programming language object being configured. In particular, the graphical programming language object view 204 may provide a graphical representation of programming code, such as control logic, being developed for the process control entity, and provides the main window for the user to configure the graphical programming language object for a process control entity. As seen in FIG. 6, the graphical programming language object view 204 provides the graphical programming language object as a block or series of blocks, which may represent the composite blocks and/or phase classes of the graphical programming language object, where each block includes various steps, transitions, actions or other programming language object fragments of the overall graphical programming language object for the process control entity. When a user selects a block from the graphical programming language object view 204, the editing tool 100 displays all available properties for the block in the parameter view 210, displays all steps and transitions associated with the block in the summary view 208 and highlights the primary block in the hierarchy view 206.

The graphical programming language object view 204 enables the user to modify properties of the graphical programming language object. For example, a user may modify composite block or phase properties by selecting a "properties" option. The editing tool 100 may then display a "properties" dialog box, which enables the user to set new values for the property. The editing tool 100 saves the new value and closes the dialog box.

The user may also add programming language object fragments to the graphical programming language object, by selecting programming language object fragment representations from the stencil view 202 and dragging them to the graphical programming language object view 204. The editing tool 100 then displays the added programming language object fragment representation in the graphical programming language object view 204. For example, to add a step item to the graphical programming language object, the user selects a step item representation from the stencil view 202 and drags the representation into the graphical programming language object view 204. The editing tool displays a properties dialog box for the selected step item, and the user provides new values for the available properties of the step item. The step item, which may be represented by a block, is displayed in the graphical programming language object view 204 in the location where the representation of the step item was dragged by the user. Likewise, to add a transition item to the graphical programming language object, the user selects a transition item representation from the stencil view 202 and drags the representation into the graphical programming language object view 204. The editing tool 100 displays a properties dialog box for the selected transition item, and the user provides new values for the available properties of the transition item. The transition item, which may be represented by a cross figure, is displayed in the graphical programming language object view 204 in the location where the representation of the transition item was dragged by the user.

The editing tool 100 further enables the user to establish logical connections between the programming language object fragments of the graphical programming language object. In particular, representations of the programming language object fragments in the graphical programming language object view 204 may include representations indicating various inputs and outputs of each item. A user may select an I/O point of a programming language object fragment and drag a GUI cursor to an I/O point of another programming language object fragment. The editing tool 100 may then display a line connecting the two programming language object fragments in the graphical programming language object view 204. If the user creates an invalid connection between programming language object fragments, the editing tool 100 may display an error message describing the invalid action by the user. Invalid connections include, but are not limited to, connections between two input points, connections between two output points, connections between two step items, and connections between two transition items.

Programming language object fragments may also be added to the graphical programming language object by copying existing programming language object fragments within the graphical programming language object and pasting the copied programming language object fragments in a different location in the graphical programming language object. In particular, a representation of a programming language object fragment may be selected, and the user may select a "copy" option which copies the selected programming language object fragments. The user may then select a "paste" option which causes the editing tool 100 to display a representation of the copied programming language object in the graphical programming language object view 204.

Properties of each programming language object fragment displayed within the graphical programming language object view 204 may be modified. In particular, a user may select a representation of a programming language object fragment in the graphical programming language object view 204 and select a "properties" option associated therewith. The editing tool 100 displays a properties dialog box prompting the user for new parameter values for the selected programming language object fragment.

The graphical programming language object view 204 further enables the user to select particular graphical programming language object items, such as the steps, transitions, actions or other programming language object fragments that make up the graphical programming language object. When a representation of a programming language object fragment is selected within the graphical programming language object view 204, the editing tool highlights the selected programming language object fragment and updates the available actions associated therewith in the summary view 208 and updates the parameter view 210 with the available properties for the selected programming language object fragment.

In addition to individually selecting a programming language object fragments, the GUI enables the user to concurrently select multiple programming language object fragments in the graphical programming language object view 204. For example, a user may drag a GUI cursor across multiple graphical programming language object item representations to create a selection box over the items, or individually add the programming language object fragment representations to a group of selected programming language object fragments. The editing tool 100 highlights the selected items in the graphical programming language object view 204, highlights the selected programming language object fragments and updates the available actions of the selected programming language object fragments in the summary view 208 and updates the parameter view 210 with the combined properties of the selected programming language object fragments.

When individually or concurrently selecting programming language object fragments, the editing tool 100 enables the user to delete, copy/paste or modify the selected programming language object fragment(s). A concurrent copy/paste operation for multiple programming language object fragments is similar to the copy/paste operation described above. To delete a programming language object fragment(s) from the graphical programming language object, the user selects the programming language object fragment representation(s) from the graphical programming language object view 204 as provided above, and indicates a delete option, for example by clicking on a delete option provided by the GUI or using a keyboard. In response, the editing tool 100 removes the selected programming language object fragment representation(s) from the graphical programming language object view 204, and removes the corresponding items(s) and applicable actions from the summary view 208.

To modify a programming language object fragment(s) from the graphical programming language object, the user selects the programming language object fragment representation(s) from graphical programming language object view 204 as provided above. If multiple programming language object fragments are selected, the editing tool 100 enables the user to concurrently modify properties that are common among the selected programming language object fragments. However, the editing tool 100 may prevent the user from concurrently modifying properties that are not common among the selected programming language object fragments, such as the names of the programming language object fragments. The common properties may be displayed in the summary view 208, and the user it may enter or modify parameter values in the summary view 208. Alternatively or in addition, the common properties may be displayed in the parameter view 210 and the user may enter or modify the values therein. The editing tool 100 updates the configuration file with the new values for each of the selected programming language object fragments.

The hierarchy view 206 provides a tree diagram of the graphical programming language object and subordinate logic blocks, such as running, holding, and embedded composite, for example. The graphical programming language object may be represented as a series of blocks in the hierarchy view 206, which represent composite blocks or phase classes. The editing tool 100 may enable a user to select a block within the hierarchy view 206, and the editing tool displays all available properties for the block in the parameter view 210, and displays all steps and transitions associated with the block in the summary view 208. Embedded composite blocks may be added from the hierarchy view 206. For example, a user may select a block, such as a phase logic block or composite block, in the hierarchy view 206 and the editing tool 100 displays a context menu is a list of available options, including an "add" option which may be selected by the user. The editing tool 100 may display a "custom block" dialogue box, and the user may select an "embedded composite" option and enter a new name for the block. The editing tool 100 closes the dialog box and adds the new embedded block under the selected composite or phase logic block.

The summary view 208 provides different summary views, including a step/transition summary view 214, an action summary view 216 and a failure condition summary view 218, each of which may be associated with a tab indicating each view. The step/transition summary view 214 provides a list of all the steps and transitions configured for the graphical programming language object displayed in the graphical programming language object view 204. The editing tool 100 may enable a user to select a step or transition listed in the step/transition summary view 214. When a step, transition or other programming language object fragment is selected individually or concurrently with other programming language object fragments within the GUI, including selected from the step/transition summary view 214 or the graphical programming language object view 204, the editing tool 100 clears the action summary view 216, provides the associated properties in the parameter view 210 and displays no items in the failure condition view 218.

New steps, transitions or other programming language object fragments may be added in the step/transition summary view 214, by enabling the user to drag a programming language object fragment representation from the stencil view 202 into the step/transition summary view 214, or by selecting an "add step/transition" or similar option. The editing tool 100 displays a "properties" dialog box for the selected programming language object fragment, and the user may enter new values for the properties of the programming language object fragment. The editing tool 100 then adds the new programming language object fragment to the list of the step/transition summary view 214, and displays a representation of the new programming language object fragment, such as a rectangle for a step or a cross for a transition, in the graphical programming language object view 204. Steps, transitions and other programming language object fragments may be copied and pasted, individually or concurrently, by selecting the items from the step/transition summary view 214, selecting a "copy" option via the GUI or via a keyboard which copies the selected programming language object fragment(s), and selecting a "paste" option via the GUT or via a keyboard which pastes the copied programming language object fragment(s) and causes the editing tool 100 to display the pasted programming language object fragment(s) in a new line of the step/transition summary view 214 and in the graphical programming language object view 204.

Properties of programming language object fragments listed within the step/transition summary view 214 may be modified by enabling the user to select the item from the list and selecting a "properties" option, which causes the editing tool to display the "properties" dialog box for the selected programming language object fragment. The user may then modify or enter parameter values for the available properties, and the editing tool updates the entered parameter values. As disclosed above, multiple programming language object fragments may be selected and properties common among the selected programming language object fragments may be modified concurrently.

In addition, programming language object fragments listed within the step/transition summary view 214 may be deleted by enabling the user to select the item from the list and select a "delete" option via the GUT or via a keyboard, which causes the editing tool 100 to delete the selected programming language object fragment from the step/transition summary view 214 and from the graphical programming language object view 204. As with modifying properties, multiple programming language object fragments may be selected from the step/transition summary view 214 and deleted concurrently, as disclosed above.

The action summary view 216 provides a list of all actions configured for a selected step. The editing tool 100 may enable a user to select an action representation listed in the action summary view 216. When an action is selected individually or concurrently with other actions from the action summary view 216, the editing tool 100 gives focus to the selected action, retains the contents of the parameter view 210 which contain the properties of the selected step, retains the selection in the hierarchy view which highlights the composite block or phase, displays no items in the failure condition view 218, retains the focus of the selected step in the graphical programming language object view 204 and retains the focus of the selected step in the step/transition summary view 214.

Actions may be added by enabling the user to select a step item representation in the graphical programming language object view 204 and selecting the action summary view 216, which causes the editing tool 100 to display a context menu all the available options, including an "add" option. The user selects the "add" option and the editing tool 100 displays a "properties" dialog box for the action item. The user enters parameter values for the available fields in the dialog box, and the editing tool 100 adds the new action to the action summary view 214. Alternatively, a user may drag an action item from the stencil view and drop the selected action item into a specific step item in the graphical programming language object view 204. Actions may be copied and pasted, individually or concurrently, by selecting the action items representations from the action summary view 216, selecting a "copy" option via the GUI or via a keyboard which copies the selected action(s), and selecting a "paste" option via the GUI or via a keyboard which pastes the copied action(s) and causes the editing tool 100 to display a representation of the pasted action(s) in a new line of the action summary view 216.

Properties of the actions listed in the action summary view 216 may be modified by enabling the user to select a step item from the graphical programming language object view 204 or from the step/transition summary view 214, selecting a specific action item representation from the action summary view 216 and selecting a "properties" option, which causes the editing tool to display the "properties" dialog box for the selected action item. The user may then modify or enter parameter values for the available properties, and the editing tool 100 updates the entered values. As disclosed above, multiple actions may be selected and properties common among the selected actions may be modified concurrently.

Likewise, actions listed within the action summary view 216 may be deleted by enabling the user to select the action item from the list and select a "delete" option via the GUI or via a keyboard, which causes the editing tool 100 to delete the selected action item from the action summary view 216. As with modifying properties, multiple actions may be selected from the action summary view 216 and deleted concurrently, as disclosed above.

The failure condition summary view 218 provides a list of all failure conditions configured for a graphical programming language object. The user may be enabled to select a failure condition individually or concurrently with other failure conditions, by selecting a condition(s) from the failure condition summary view 218. The editing tool 100 gives focus to the selected condition, displays no contents in the parameter view 210, retains the selection in the hierarchy view which highlights the failure monitor block, displays no items in the graphical programming language object view 204 and displays no items in the step/transition summary view 214.

Failure conditions may be added by providing the user with a context menu of available options, including an "add" option. The user may select the "add" option, and the editing tool 100 displays the "properties" dialog box for the condition. The user enters parameter values in the available fields of the dialog box, and the editing tool 100 adds the new condition to the failure condition summary view 218. Conditions may also be copied, pasted or deleted, individually or concurrently, in a manner similar to the step/transition items as disclosed above but with respect to the failure condition summary view 218. Likewise, properties of a condition may be modified individually or concurrently with other conditions in a manner similar to the step/transition items disclosed above.

The parameter view 210 provides a list of all properties configured for the graphical programming language object or programming language object fragment thereof, and the editing tool 100 displays the properties of the graphical programming language object or programming language object fragment that is selected or otherwise in focus. The editing tool may enable the user to select properties in the parameter view 210 individually or concurrently, and modify the selected properties by entering new parameter values in the parameter view 210 or in a "properties" dialog box generated by the editing tool 100. The editing tool 100 updates the parameter view 210 with the new values. New properties may also be added by enabling the user to select an empty row in a parameter column of the parameter view 210, providing the new property with a name, selecting the type of property and entering a parameter value for the property. Properties may also be deleted by enabling the user to select one or more properties in the parameter view 210 and selecting a delete option provided by the GUI or via a keyboard, and the editing tool 100 removes the property from the parameter view 210. The editing tool 100 may further enable the user to copy and paste properties, by selecting one or more properties from the parameter view 210, selecting a copy option provided by the GUI or via a keyboard which copies the selected property and selecting a paste option provided by the GUI or via a keyboard which adds the copied property to the parameter view 210 with a new property name which may be defined by the user. The editing tool 100 may place restrictions on the particular parameter values that the user is permitted to modify by marking the property as non-editable or by marking a property field as read-only.

Using the editing tool 100 and the GUI as disclosed above, a user may easily create and configure a new graphical programming language object, or modify an existing graphical programming language object imported from the configuration database. Editing of programming language object fragments may include overriding default values with the data specific to a particular project, as disclosed above. For example, when a user is configuring a graphical programming language object for a process control entity in the physical layer of a process control system, such as nodes, I/O cards, devices, etc., the user may prepare a table of project-specific data in the off-line database 104 for the process control entity. Because the programming language object fragments are provided as templates, which may include default values, the editing tool 100 creates instances of the programming language object fragments based on database definitions and overrides the default values with the project-specific data for the process control entity.

By providing the programming language object fragments as templates, the programming language object fragments may be used multiple times within the same or different graphical programming language objects and updated with different parameter values according to the project specifications. Further, by providing the programming language object fragments as templates, multiple users, including users among different engineering and design teams, may use the same programming language object fragments and modify them according to their specific project standards.

In another example, when a user is configuring a graphical programming language object for a process control entity in the logical layer of a process control system, the editing tool 100 may use generic templates/classes of programming language object fragments that already exist, and overlay the default values with project data. However, sometimes it is necessary to create templates/classes of programming language object fragments specific to an end user. The logic from the programming language object fragments remains the same, but the programming language object fragments are provided with a different default values specific to the project. Such end user-specific copies are created in the code library master 120 and imported to the off-line databases 104. The end user-specific programming language object fragments are then used as a starting point for configuring a graphical programming language object for a process control entity for the end-user. As such, the editing tool 100 involves not just configuring graphical programming language objects using programming language object fragments, but also setting up the code libraries with end user-specific default values.

In addition to using programming language object fragments from the code library, individual users may add to the library by creating new programming language object fragments. In particular, programming language object fragments modified with new parameter values or other property changes may be used within graphical programming language objects for other process control entities. Still further, groups of programming language object fragments may be selected from the graphical programming language object view 204, including the graphical programming language object itself, and grouped together to create a composite programming language object fragment which may be stored within the code library master 120 and distributed among the workstations 130 for use in configuring graphical programming language objects for other process control entities. The composite programming language object fragments may be saved as a template, with or without default values, or with values specific to the process control entity for which it was originally created.

The editing tool 100 further allows concurrent editing of programming language object fragments, including modification, deletion, etc. Although many of the examples above include modifying properties common among multiple programming language object fragments, it should be understood that modifications may extend beyond parameters values to any property among the selected programming language object fragments.

The configured or modified graphical programming language object may be saved within a configuration file 110 stored within the off-line database 104. In one example, each change made to the graphical programming language object, including changes to properties, addition or deletion all of programming language object fragments, or any other editing feature, may result in an update to the configuration file 110. The configuration file 110 may be created whenever a new graphical programming language object is created, or the configuration file 110 may be imported from the configuration database and converted into a format used by the off-line database 104.

Because documentation is an important part of any process control project, and because process control end users prefer documents in standardized formats, such as Microsoft Word and Microsoft Visio, it is important to create reporting documentation based on project standards of the end user. As such, the off-line database 104 stores project data, including the configuration file 110, in a format that is easily read by standardized tools, such as the applications provided in the suite of applications of Microsoft Office. An example of such formats are SQL and XML, which allows for many different documentation formats, such as Word, PDF, HTML, Visio, etc. to read and import the data.

The reporting tool 102 may take the data for a graphical programming language object, as stored within the configuration file, from the off-line database 104. Because the off-line database 104 may be provided as an SQL database, the data is stored in a format easily read and understood by standard tools, such as Microsoft Word and Microsoft Visio, the reporting tool 102 may map the data fields of the format used by the off-line database 104 (e.g., XML fields, SQL table columns) to data fields of a reporting document template. The reporting tool 102 may then populate the data fields of the reporting document according to the map between the two formats. The reporting document is customizable, and may be provided in any format defined by the end-user. Such common documents and data management tools may be used to easily track and manage the project progress among several off-line databases and associated engineering and design teams, while allowing each engineering and design team to work with data in their preferred format without having to conform to the configuration database rules and formats.

Of course, it should be understood that a reversal of the above mapping feature may be performed when importing data from the configuration database to the off-line database 104. For example, new properties may be added or modified in the reporting document at another off-line database or at the configuration database. The new properties or other data may be read and the data fields may be mapped from the reporting document format to the off-line database format, and the off-line database 104 may be populated with the new properties or other data. The new data may be used to update or create programming language object fragments, which may be particularly useful in updating properties for a graphical programming language object. As such, configuration and modification of a graphical programming language object may be accomplished among and between various different engineering and design teams, each of which may work independently, and between the engineering and design teams and the configuration database. At the same time, each off-line database 104 need only use one graphical programming language object type, such as an SFC object.

Users may also generate project data using other tools for engineering and designing a process control project, such as computer aided design (CAD) applications, which is in a format different from that of the offline database 104, but which is useful for engineering productivity. As such, the offline database 104 may be used as a centralized project database or data repository, and data other than graphical programming language object data may also be integrated into the offline database 104. In particular, using the conversion and mapping techniques described above, data fields of the other tools, such as data fields from data files of the tools, may be mapped to the data fields of the offline database 104, such as the data fields of SQL tables, and the data fields may be populated accordingly. Tables may be added to the offline database 104 for the additional project data, and the data may be used in configuring graphical programming language objects or integrated into the configuration file for exportation to the configuration database. Accordingly, a user is able to utilize other tools and applications beyond the editing and reporting tool while allowing for full data integration.

Still further, users are able to edit the graphical programming language objects or programming language object fragments from the reporting tool 102. For example, because the reporting documentation is generated from the data of the graphical programming language object and because the data is mapped between data fields of the format used by the off-line database 104 and data fields of the reporting document template, a user may edit the objects from the reporting tool 102 by editing the data (e.g., parameter values) and push the edited data back to the offline database 104, by populating the data fields of the off-line database format (e.g., SQL tables) with the edited data.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

While the editing and reporting system and method, and other elements, have been described as preferably being implemented in software, they may be implemented in hardware, firmware, etc., and may be implemented by any other processor. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of editing a graphical programming language object for designing a process control entity within an offline database, wherein the offline database comprises one of a plurality of databases each communicatively coupled to a central configuration database, the method comprising:
    enabling a user to select one or more programming language object fragments from a library of programming language object fragments, each programming language object fragment comprising a programming logic routine for a process control entity;
    displaying the one or more selected programming language object fragments within a graphical programming language interface display;
    enabling the user to configure a graphical programming language object for a process control entity from the one or more selected programming language object fragments within the graphical programming language interface display;
    storing the configured graphical programming language object as a configuration file;
    formatting data of the graphical programming language object according to a first schema associated with a reporting document to form formatted graphical programming language object data;
    mapping the formatted graphical programming language object data to a second schema associated with the configuration database to form mapped graphical programming language object data;
    populating data fields of the reporting document with the mapped graphical programming language object data; and
    sending the mapped graphical programming language object data to the configuration database.

2. The method of claim 1, wherein enabling a user to select one or more programming language object fragments from a library of programming language object fragments comprises displaying the programming language object fragments as templates within a graphical programming language library display.

3. The method of claim 1, wherein displaying the one or more selected programming language object fragments within a graphical programming language interface display comprises displaying properties of the one or more selected programming language object fragments;
    wherein enabling the user to configure a graphical programming language object for a process control entity from the one or more selected programming language object fragments comprises enabling the user to provide values for the properties of the one or more selected programming language object fragments; and
    wherein storing the configured graphical programming language object as a configuration file comprises storing the one or more selected programming language object fragments with the provided values.

4. The method of claim 3, wherein the properties of the one or more selected programming language object fragments comprise default values for the properties of the one or more selected programming language object fragments; and
    wherein enabling the user to provide values for the properties of the one or more selected programming language object fragments comprises modifying the default values for the properties of the one or more selected programming language object fragments.

5. The method of claim 1, wherein enabling the user to configure a graphical programming language object for a process control entity from the one or more selected programming language object fragments comprises:
    copying a selected programming language object fragment from within the graphical programming interface display; and
    adding the copied programming language object fragment to the configuration file.

6. The method of claim 1, wherein enabling the user to configure a graphical programming language object from the one or more selected programming language object fragments comprises enabling the user to establish logical connections between an I/O of a first one of the one or more selected programming language object fragments and an I/O of a second programming language object fragment.

7. The method of claim 1, wherein enabling the user to configure a graphical programming language object from the one or more selected programming language object fragments comprises:
    enabling the user to concurrently select a plurality of programming language object fragments from the graphical programming language interface display;

displaying a common property among the selected plurality of programming language object fragments; and
enabling a user to concurrently modify the common property for all the selected plurality of programming language object fragments.

8. The method of claim 1, wherein enabling the user to configure a graphical programming language object from the one or more selected programming language object fragments comprises:
enabling the user to select a plurality of programming language object fragments from the graphical programming language interface display; and
enabling the user to delete the selected plurality of programming language object fragments from the graphical programming language object.

9. The method of claim 1, wherein enabling the user to configure a graphical programming language object from the one or more selected programming language object fragments comprises enabling the user to configure a graphical programming language object from a previous graphical programming language object stored within the library of programming language object fragments as a programming language object fragment.

10. The method of claim 1, further comprising storing the graphical programming language object as a new programming language object fragment within the library of programming language object fragments.

11. The method of claim 1, further comprising:
copying a programming language object fragment template, wherein the programming language object fragment template comprises a basic structure of the programming language object fragment;
enabling the user to configure the copy of the programming language object fragment template; and
storing the configured copy of the programming language object template as a new programming language object fragment within the library of programming language object fragments.

12. The method of claim 1, further comprising:
enabling the user to group a plurality of programming language object fragments from the graphical programming language interface display into a composite programming language object fragment; and
storing the composite programming language object fragment within the library of programming language object fragments.

13. The method of claim 1, further comprising sending the graphical programming language object to the central configuration database.

14. The method of claim 1, further comprising:
receiving a modified form of the graphical programming language object from the configuration database, wherein data of the modified graphical programming language object is formatted according to the second schema associated with the configuration database;
mapping the graphical programming language object data to a third schema associated with the offline database to form second mapped graphical programming language object data;
enabling the user to configure the modified graphical programming language object for a process control entity from the second mapped graphical programming language object data;
mapping data of the configured modified graphical programming language object to the first schema associated with the configuration database; and
sending the mapped graphical programming language object data of the configured modified graphical programming language object to the configuration database.

15. The method of claim 1, wherein the graphical programming language object comprises a function object.

16. The method of claim 15, wherein the function object comprises a sequential function chart object.

17. The method of claim 1, wherein the library of the programming language object fragments comprises a predefined list of one or more of the following: actions for the process control entity, steps for the process control entity, and transitions for the process control entity.

18. An editing and reporting system for use in designing a process control entity using a graphical programming language object, the editing and reporting system comprising:
a database, wherein a plurality of programming language object fragments are stored in the database and, wherein each programming language object fragment stored in the database comprises a programming logic routine for the process control entity; and
a display application stored on a computer readable memory and adapted to be executed on a processor to create a display for configuring a graphical programming language object for the process control entity from one or more of the programming language object fragments, the display including:
a stencil view having a plurality of graphics representing different ones of the programming language object fragments, and
a graphical programming language object view, and
a summary view having a failure tab and a list of all programming language object fragments configured for a specific graphical programming language object displayed within the graphical programming language object view,
wherein the display application is structured to enable a user to select different ones of the programming language object fragment representations within a stencil view to specify a programming language object fragment to include in the graphical programming language object and presents the programming language object fragment representation in the graphical programming language object view to enable the user to configure the graphical programming language object for the process control entity, and is structured to enable the user to configure selected ones of the programming language object fragments displayed within the summary view, wherein the failure tab is structured to enable failure conditions associated with the specific graphical programming language object displayed within the graphical programming language object view to be displayed.

19. The editing and reporting system of claim 18, wherein the database comprises a programming language code library file comprising a list of actions, steps and transitions to be used in configuring the graphical programming language object for the process control entity.

20. The editing and reporting system of claim 18, wherein the display application further includes a parameter view, and wherein the display application is structured to enable the user to select different ones of the programming language object fragment representations in the graphical programming language object view and displays properties of the selected programming language object fragment representation in the parameter view.

21. The editing and reporting system of claim 18, wherein the display application further includes a hierarchy view having a diagram of the graphical programming language object comprising a plurality of logic blocks displayed according to a logical relationship.

22. The editing and reporting system of claim 21, wherein the display application further includes a parameter view, and wherein the display application is structured to enable the user to select different ones of the logic blocks within the hierarchy view and displays properties of a selected logic block within the parameter view.

23. The editing and reporting system of claim 18, wherein the summary view includes a step/transition tab that is structured to enable steps and transitions configured for the graphical programming language object displayed within the graphical programming language object view to be viewed.

24. The editing and reporting system of claim 23, wherein the summary view includes an action tab is structured to enable actions configured for a selected one of the steps from the step/transition tab to be viewed.

25. The editing and reporting system of claim 18, wherein the display application further structured to enable the user to modify properties of a selected one of the programming language object fragments.

26. The editing and reporting system of claim 18, wherein the display application further is structured to enable the user to select a plurality of programming language object fragment representations from within the graphical programming language object view and concurrently modify a property common among the programming language object fragments associated with the selected plurality of programming language object fragment representations.

27. The editing and reporting system of claim 18, wherein the display application further is structured to enable the user to select a plurality of programming language object fragment representations from within the graphical programming language object view and concurrently delete the programming language object fragments associated with the selected plurality of programming language object fragment representations.

28. The editing and reporting system of claim 18, where the display application further is structured to enable the user to establish logical connections between an I/O of a first programming language object fragment and an I/O a second programming language object fragment within the graphical programming language object view.

29. The editing and reporting system of claim 18, wherein the display application further is structured to enable the user to store one or more programming language object fragments displayed within the graphical programming language object view as a composite programming language object fragment and displays the composite programming language object fragments as a programming language object fragment within the stencil view.

30. An editing and reporting system for use in designing a process control entity using a graphical programming language object, the editing and reporting system comprising:

a database, wherein a plurality of programming language object fragments are stored in the database, wherein each programming language object fragment comprises a programming logic routine for the process control entity;

a display application stored on a computer readable memory and adapted to be executed on a processor to create a display for configuring a graphical programming language object for the process control entity from one or more of the programming language object fragments, the display including a stencil view having a plurality of graphics representing different ones of the programming language object fragments and a graphical programming language object view, wherein the display application is structured to enable a user to select different ones of the programming language object fragment representations within a stencil view to specify a programming language object fragment to include in the graphical programming language object and presents the programming language object fragment representation in the graphical programming language object view to enable the user to configure the graphical programming language object for the process control entity; and a reporting application stored on a computer readable memory and adapted to be executed on a processor to format data of the graphical programming language object according to a first schema to form formatted graphical programming language object data, map the formatted graphical programming language object data to a second schema associated with a reporting document and send the mapped graphical programming language object data to a configuration database, and further populates data fields of the reporting document with the mapped graphical programming language object data.

31. The editing and reporting system of claim 30, wherein the database comprises a programming language code library file comprising a list of actions, steps and transitions to be used in configuring the graphical programming language object for the process control entity.

32. The editing and reporting system of claim 30, wherein the display application further includes a parameter view, and wherein the display application is structured to enable the user to select different ones of the programming language object fragment representations in the graphical programming language object view and displays properties of a selected programming language object fragment representation in the parameter view.

33. The editing and reporting system of claim 30, wherein the display application further includes a hierarchy view having a diagram of the graphical programming language object comprising a plurality of logic blocks displayed according to a logical relationship.

34. The editing and reporting system of claim 33, wherein the display application further includes a parameter view, and wherein the display application is structured to enable the user to select different ones of the logic blocks within the hierarchy view and displays properties of the selected logic block within the parameter view.

35. The editing and reporting system of claim 30, wherein the display application further includes a summary view having a list of all programming language object fragments configured for a specific graphical programming language object displayed within the graphical programming language object view, wherein the display application is structured to enable the user to configure selected ones of the programming language object fragments displayed within the summary view.

36. The editing and reporting system of claim 35, wherein the summary view includes a step/transition tab that is structured to enable steps and transitions configured for the graphical programming language object displayed within the graphical programming language object view to be viewed.

37. The editing and reporting system of claim 36, wherein the summary view includes an action tab that is structured to enable actions configured for a selected one of the steps from the step/transition tab to be viewed.

38. The editing and reporting system of claim 30, wherein the display application further is structured to enable the user to modify properties of a selected one of the programming language object fragments.

39. The editing and reporting system of claim 30, wherein the display application further is structured to enable the user to select a plurality of programming language object fragment representations from within the graphical programming language object view and concurrently modify a property common among the programming language object fragments associated with the selected plurality of programming language object fragment representations.

40. The editing and reporting system of claim 30, wherein the display application further is structured to enable the user to select a plurality of programming language object fragment representations from within the graphical programming language object view and concurrently delete the programming language object fragments associated with the selected plurality of programming language object fragment representations.

41. The editing and reporting system of claim 30, where the display application further is structured to enable the user to establish logical connections between an I/O of a first programming language object fragment and an I/O a second programming language object fragment within the graphical programming language object view.

42. The editing and reporting system of claim 30, wherein the display application further is structured to enable the user to store one or more programming language object fragments displayed within the graphical programming language object view as a composite programming language object fragment and displays the composite programming language object fragments as a programming language object fragment within the stencil view.

43. A method of editing and reporting a graphical programming language object for use in designing a process control entity comprising:
   storing a plurality of programming language object fragments each comprising a programming language logic routine for a process control entity in a database;
   displaying a stencil view having a plurality of programming language object fragment representations of a plurality of programming language object fragments;
   displaying a graphical programming language object view associated with a graphical programming language object to be configured;
   enabling a user to select one of the plurality of programming language object fragment representations within the stencil view to be included within the graphical programming language object;
   presenting the programming language object fragment associated with the selected programming language object fragment representation in the graphical programming language object view;
   enabling the user to configure the graphical programming language object using the selected programming language object fragment;
   storing the configured graphical programming language object in an offline database;
   formatting data of the graphical programming language object according to a schema associated with the offline database to form formatted graphical programming language object data;
   mapping the formatted graphical programming language object data to a schema associated with a reporting document different from the offline database format to form mapped graphical programming language object data;
   populating data fields of the reporting document with the mapped graphical programming language object data;
   enabling a user to edit the graphical programming language object data from the reporting document;
   populating data fields of an offline database with the edited graphical programming language object data; and
   storing the edited graphical programming language object data in the offline database.

44. The method of claim 43, further comprising:
   displaying a parameter view associated with properties of the selected programming language object fragment; and
   enabling the user to modify one or more of the properties displayed within the parameter view.

45. The method of claim 43, further comprising displaying a hierarchy view associated with the graphical programming language object, wherein the graphical programming language object is presented within the graphical programming language object view according to a first format and wherein the graphical programming language object is presented within the hierarchy view according to a second format.

46. The method of claim 45, wherein the second format comprises a plurality of logic blocks displayed according to a logical relationship.

47. The method of claim 43, wherein the graphical programming language object comprises a plurality of programming language object fragments, and wherein enabling the user to configure the graphical programming language object comprises enabling the user to select a plurality of programming language object fragments within the graphical programming language object view and concurrently modify a property common among the selected plurality of programming language object fragments.

48. The method of claim 43, wherein the graphical programming language object comprises a plurality of programming language object fragments, and wherein a enabling the user to configure the graphical programming language object comprises enabling the user to select a plurality of programming language object fragments within the graphical programming language object view and concurrently delete the selected plurality of programming language object fragments.

49. The method of claim 43, further comprising:
   enabling the user to select a plurality of programming language object fragments within the graphical programming language object view;
   storing the plurality of selected programming language object fragments as a composite programming language object fragment; and
   displaying the composite programming language object fragment within the stencil view.

50. The method of claim 43,
   wherein formatting data of the graphical programming language object comprises formatting data of the graphical programming language object according to an extensible markup language schema to form formatted graphical programming language object data,
   the method further comprising sending the populated reporting documents to a configuration database.

51. The method of claim 43, wherein storing the configured graphical programming language object comprises storing the configured graphical programming language object in an offline database, the method further comprising:

receiving process control entity project data generated by a process control entity project tool at the offline database, wherein the process control entity project data is in a format different from a format used by the offline database;

mapping the process control entity project data from a schema associated with the process control entity project tool format to a schema associated with the offline database format to form mapped process control entity project data;

populating data fields of the offline database with the mapped process control entity project data; and integrating the populated process control entity project data in a configuration file with the configured graphical programming language object.

* * * * *

UNITED STATES PATENT AND TRADEMARK OFFICE
CERTIFICATE OF CORRECTION

| | | |
|---|---|---|
| PATENT NO. | : 7,668,608 B2 | |
| APPLICATION NO. | : 11/469827 | |
| DATED | : February 23, 2010 | |
| INVENTOR(S) | : Mark J. Nixon et al. | |

It is certified that error appears in the above-identified patent and that said Letters Patent is hereby corrected as shown below:

At Column 2, line 16, "a integrated" should be -- an integrated --.

At Column 10, line 15, "graphic, line" should be -- graphic, and line --.

Signed and Sealed this
Fourteenth Day of June, 2011

David J. Kappos
*Director of the United States Patent and Trademark Office*